United States Patent
Yao et al.

(10) Patent No.: US 11,114,859 B2
(45) Date of Patent: Sep. 7, 2021

(54) POWER CONVERSION SYSTEM, PHOTOVOLTAIC OPTIMIZER AND POWER TRACKING METHOD THEREOF

(71) Applicant: Silergy Semiconductor Technology (Hangzhou) LTD, Hangzhou (CN)

(72) Inventors: Kaiwei Yao, Sunnyvale, CA (US); Zhiyuan Shen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/809,750

(22) Filed: Mar. 5, 2020

(65) Prior Publication Data

US 2020/0295572 A1    Sep. 17, 2020

(30) Foreign Application Priority Data

Mar. 15, 2019   (CN) .................. 201910199942.X (51) Int. Cl.
*H02J 3/00*   (2006.01)
*H02J 3/38*   (2006.01)
*H02M 3/158*  (2006.01)

(52) U.S. Cl.
CPC .............. *H02J 3/381* (2013.01); *H02M 3/158* (2013.01); *H02J 2300/26* (2020.01)

(58) Field of Classification Search
CPC ...... H02J 3/381; H02J 2300/26; H02M 3/158; H02M 2001/0025; H02M 2001/0022; Y02E 10/56
USPC .......................................................... 307/82
See application file for complete search history.

(56) References Cited

U.S. PATENT DOCUMENTS

| | | | |
|---|---|---|---|
| 6,433,522 B1 | 8/2002 | Siri | |
| 8,093,756 B2 | 1/2012 | Porter et al. | |
| 8,816,535 B2 | 8/2014 | Adest et al. | |
| 8,963,369 B2 | 2/2015 | Sella et al. | |
| 8,965,589 B2 | 2/2015 | Zhao | |
| 9,548,619 B2* | 1/2017 | Gazit | H02J 7/00 |
| 9,853,538 B2* | 12/2017 | Adest | H01L 31/02021 |
| 10,637,393 B2* | 4/2020 | Sella | H01L 31/02021 |
| 2010/0157632 A1 | 6/2010 | Batten et al. | |
| 2010/0176773 A1 | 7/2010 | Capel | |
| 2011/0224839 A1 | 9/2011 | Thompson | |
| 2011/0316346 A1 | 12/2011 | Porter et al. | |

(Continued)

FOREIGN PATENT DOCUMENTS

| | | |
|---|---|---|
| CN | 107359792 A | 11/2017 |
| CN | 107370187 A | 11/2017 |

*Primary Examiner* — Ryan Jager
(74) *Attorney, Agent, or Firm* — Michael C. Stephens, Jr.

(57) ABSTRACT

An apparatus for photovoltaic power generation can include: an inverter; and at least one photovoltaic optimizer, where input terminals of each photovoltaic optimizer are coupled to output terminals of a photovoltaic panel, and output terminals of each photovoltaic optimizer are coupled in series with each other between input terminals of the inverter; where a maximum power point of the photovoltaic panel is tracked in accordance with an input voltage of the inverter when the photovoltaic optimizer operates in a first mode; and the maximum power point of the photovoltaic panel is tracked in accordance with an output voltage of the photovoltaic panel when the photovoltaic optimizer operates in a second mode.

18 Claims, 8 Drawing Sheets

(56) References Cited

U.S. PATENT DOCUMENTS

2012/0205974 A1* 8/2012 McCaslin ............... H02J 3/381
  307/18
2015/0015072 A1    1/2015 Deboy et al.
2016/0344192 A1* 11/2016 Eizips ..................... H02J 3/38
2019/0280605 A1*  9/2019 Krzywinski ............. H02J 3/32

* cited by examiner

POWER CONVERSION SYSTEM, PHOTOVOLTAIC OPTIMIZER AND POWER TRACKING METHOD THEREOF

RELATED APPLICATIONS

This application claims the benefit of Chinese Patent Application No. 201910199942.X, filed on Mar. 15, 2019, which is incorporated herein by reference in its entirety.

FIELD OF THE INVENTION

The present invention relates to the field of power electronics, and more particularly to power conversion systems, photovoltaic optimizers, and associated power tracking methods.

BACKGROUND

Since an output voltage of a photovoltaic panel is relatively low, multiple photovoltaic panels can be coupled in series or parallel, in order to increase the output voltage and output power of a photovoltaic power generation system. The output power of the photovoltaic power generation system may have one peak point when under illumination and a temperature can remain the same. Thus, a maximum power point tracking of the photovoltaic power generation system can be performed according to perturbation observation and incremental admittance approaches. However, output characteristics of the photovoltaic panels may no longer be consistent with each other when some panels are partially covered by obstacles, which may result in a relatively large decrease of the output power of the photovoltaic cell.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
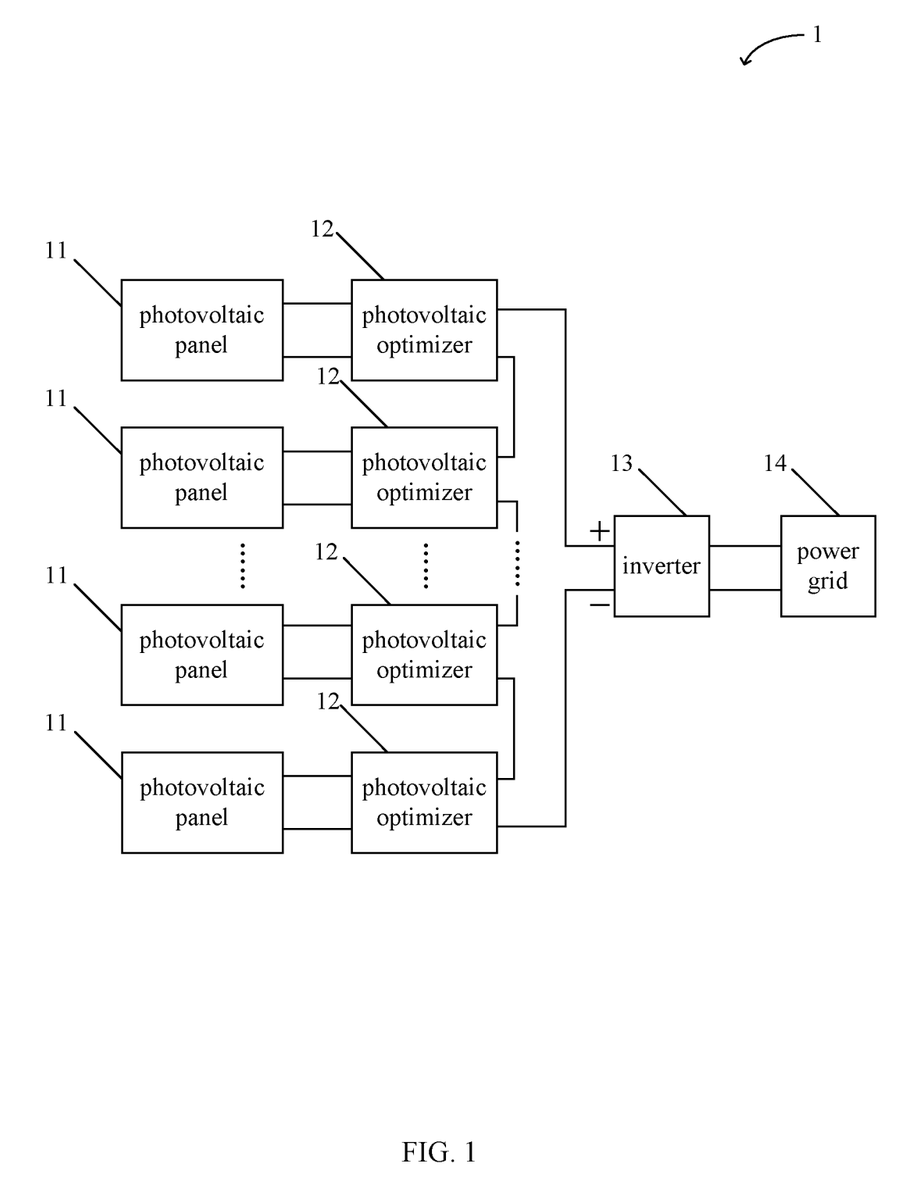
FIG. 1 is a schematic block diagram of an example photovoltaic power generation system, in accordance with embodiments of the present invention.

Referring now to FIG. 1, shown is a schematic block diagram of an example photovoltaic power generation system, in accordance with embodiments of the present invention. Photovoltaic power generation system 1 can include at least one photovoltaic panel 11, at least one photovoltaic optimizer 12, and inverter 13. Input terminals of each photovoltaic optimizer 12 may correspondingly be coupled to output terminals of each photovoltaic panel 11, and output terminals of each photovoltaic optimizer 12 can be coupled in series between input terminals of inverter 13. In photovoltaic power generation system 1, photovoltaic panel 11 and photovoltaic optimizer 12 can convert solar energy into direct current electric power, and then transmit direct current electric power to inverter 13. Inverter 13 can convert the direct current electric power into alternating current electric power, and then may transmit the alternating current electric power to power grid 14.

In particular embodiments, photovoltaic optimizer 12 can operate in first and second modes. In the first mode, photovoltaic optimizer 12 can operate in a through mode and can track the maximum power point of photovoltaic power generation system 1 by adjusting an input voltage of inverter 13. For example, the input voltage of inverter 13 is the sum of the output voltages of each photovoltaic optimizer 12. In the second mode, photovoltaic optimizer 12 may operate in a switching mode and can track the maximum power point of photovoltaic power generation system 1 by tracking an output voltage of photovoltaic panel 11. For example, the output voltage of photovoltaic panel 11 may correspond to an input voltage of photovoltaic optimizer 12.

In one example, photovoltaic optimizer 12 can adjust an input voltage reference signal corresponding to the input voltage of photovoltaic optimizer 12, according to changes of the input voltage, the output voltage, and/or an output current of photovoltaic optimizer 12. Photovoltaic optimizer 12 can receive the updated input voltage reference signal, in order to change the maximum power point of the system. In particular embodiments, there are several ways to realize the adjustment of the input voltage reference signal, including obtaining adjustment direction of the input voltage reference signal (e.g., increasing or decreasing), and gaining a target voltage of the input voltage reference signal and then adjusting the input voltage reference signal to the target voltage.

In one example, photovoltaic optimizer 12 can adjust the input voltage reference signal in accordance with the change of the output voltage of photovoltaic optimizer 12 (e.g., the input voltage of inverter 13) in the first mode, and can adjust the input voltage reference signal according the change of the input voltage of photovoltaic optimizer 12 in the second mode. In one example, photovoltaic optimizer 12 can also operate in a third mode, whereby photovoltaic optimizer 12 operates in a limited voltage mode. In that case, inverter 13 can adjust the output power of photovoltaic optimizer 12 in order to track the maximum power point of the system.

In particular embodiments, when a duty ratio of the photovoltaic optimizer 12 is 1, photovoltaic optimizer 12 can operate in the first mode. Also, when the duty ratio of the photovoltaic optimizer 12 is less than 1, photovoltaic optimizer 12 can operate in the second mode. Further, when the output voltage of the photovoltaic optimizer 12 is not less than a preset maximum voltage, photovoltaic optimizer 12 can operate in the third mode.

In one example, photovoltaic optimizer 12 can increase or decrease the input voltage reference signal according to the relationship between an operation point of inverter 13 and a maximum power point of photovoltaic panel 11 in the first mode. Alternatively, in response to the increase of the output power of photovoltaic optimizer 12, the input voltage reference signal in a next cycle may be obtained according to the output voltage of photovoltaic optimizer 12 in a present cycle. For instance, the input voltage reference signal of photovoltaic optimizer 12 in a next cycle can be adjusted to be the output voltage of photovoltaic optimizer 12 in the present cycle minus a preset step, in order to track the maximum power point of the photovoltaic power generation system. In particular embodiments, in response to the output power of photovoltaic optimizer 12 not increasing in the first mode, photovoltaic optimizer 12 may continue operating in the first mode, or may switch to the second mode.

In one example, photovoltaic optimizer 12 can increase or decrease the input voltage reference signal in the second mode according to the relationship between an operation point of photovoltaic optimizer 12 and the maximum power point of photovoltaic panel 11. Alternatively, when the output power of photovoltaic optimizer 12 does not increase and the input voltage of photovoltaic optimizer 12 increases (e.g., when the operation point of photovoltaic optimizer 12 is at the right of the maximum power point of photovoltaic panel 11), photovoltaic optimizer 12 can decrease the input voltage reference signal, such as by subtracting a first step from the input voltage reference signal of photovoltaic optimizer 12 in the present cycle as the input voltage reference signal of photovoltaic optimizer 12 in the next cycle.

When the output power of photovoltaic optimizer 12 does not increase and the input voltage of photovoltaic optimizer 12 decreases (e.g., the operation point of photovoltaic optimizer 12 is at the left of the maximum power point of photovoltaic panel 11), photovoltaic optimizer 12 can increase the input voltage reference signal, such as increasing the input voltage reference signal of photovoltaic optimizer 12 in the present cycle by a second step to be the input voltage reference signal of photovoltaic optimizer 12 in the next cycle. When the output power of photovoltaic optimizer 12 increases and the input voltage of photovoltaic optimizer 12 increases (e.g., the operation point of photovoltaic optimizer 12 is at the left of the maximum power point of photovoltaic panel 11), photovoltaic optimizer 12 can increase the input voltage reference signal, such as increasing the input voltage reference signal of photovoltaic optimizer 12 in the present cycle by the second step to be the input voltage reference signal of photovoltaic optimizer 12 in the next cycle.

When the output power of photovoltaic optimizer 12 increases and the input voltage of photovoltaic optimizer 12 decreases (e.g., the operation point of photovoltaic optimizer 12 is at the right of the maximum power point of photovoltaic panel 11), photovoltaic optimizer 12 can decrease the input voltage reference signal, such as subtracting the first step from the input voltage reference signal of photovoltaic optimizer 12 in the present cycle as the input voltage reference signal of photovoltaic optimizer 12 in the next cycle. Thus, the maximum power point of photovoltaic power generation system 1 can be tracked. It should be understood that the first step can be equal to the second step in some cases, and may be unequal in other cases. Furthermore, the values of the first step and the second step can be fixed in some cases, and variable in other cases.

In one example, when photovoltaic optimizer 12 operates in the third mode, the input voltage reference signal in the next cycle can be obtained in accordance with the output voltage of photovoltaic optimizer 12 in the present cycle. For example, the input voltage reference signal of photovoltaic optimizer 12 in the next cycle may be adjusted to be the output voltage of photovoltaic optimizer 12 in the present cycle minus a preset step, in order to track the maximum power point of the photovoltaic power generation system 1. In particular embodiments, the maximum power point of the system can be tracked by tracking the input voltage of the photovoltaic optimizer and/or the input voltage of the inverter. Therefore, the photovoltaic optimizer can cooperate with the inverter in order to achieve effective recognition and tracking of the maximum power point of the photovoltaic power generation system, such that the output power of the photovoltaic power generation system can effectively be improved when some panels are partially covered.

Figure 2:
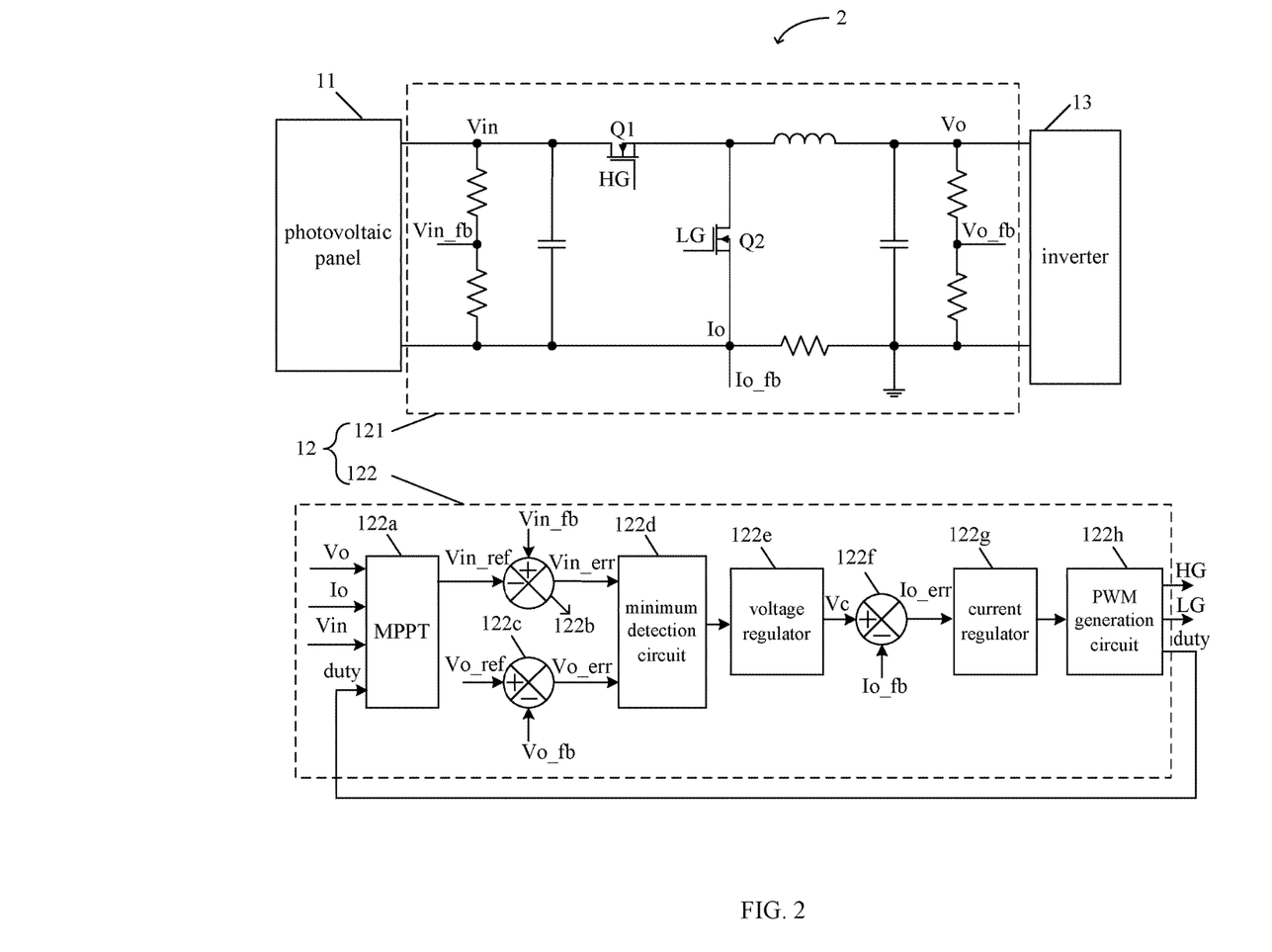
FIG. 2 is a schematic block diagram of an example power conversion system for the photovoltaic power generation, in accordance with embodiments of the present invention.

Referring now to FIG. 2, shown is a schematic block diagram of an example power conversion system for the photovoltaic power generation, in accordance with embodiments of the present invention. In this particular example, power conversion system 2 can include inverter 13 and photovoltaic optimizer 12. Photovoltaic optimizer 12 can include power conversion converter 121 and control circuit 122. Power conversion converter 121 can convert the output power of photovoltaic panel 11, and may be configured in any suitable converter topology (e.g., buck, boost, buck-boost, etc.).

In particular embodiments, control circuit 122 can include maximum power point tracking (MPPT) 122a, error signal generation circuit 122b, error signal generation circuit 122c, minimum detection circuit 122d, voltage regulator 122e, error signal generation circuit 122f, current regulator 122g, and pulse-width modulation (PWM) generation circuit 122h. MPPT 122a can adjust input voltage reference signal Vin_ref corresponding to input voltage Vin, according to the changes of input voltage Vin, output voltage Vo, and output current Io of photovoltaic optimizer 12, in order to track the maximum power point of photovoltaic power generation system 1.

In particular embodiments, error signal generation circuit 122b may be used for generating error signal Vin_err, in accordance with input voltage reference signal Vin_ref and input voltage feedback signal Vin_fb representing input voltage Vin. In addition, error signal generation circuit 122c can generate error signal Vo_err according to output voltage reference signal Vo_ref and output voltage feedback signal Vo_fb representing output voltage Vo. In one example, output voltage reference signal Vo_ref can be set to be preset maximum voltage Vh. Minimum detection circuit 122d can compare error signal Vin_err against error signal Vo_err, and can provide the minimum of the two voltages to voltage regulator 122e. Here, voltage regulator 122e can generate current reference signal Vc according the minimum of error signals Vin_err and Vo_err. In addition, error signal generation circuit 122f can generate error signal Io_err in accordance with current reference signal Vc and output current feedback signal Io_fb representing output current Io. PWM generation circuit 122h can generate switching control signal HG for power switch Q1 and switching control signal LG for power switch Q2 in power conversion converter 121 according to error signal Io_err processed by current regulator 122g, and may transmit the duty ratio of switching control signal HG to MPPT 122a. Thus, the duty ratio of power conversion converter 121 can be adjusted according to a loop of the input voltage of photovoltaic optimizer 12, or a loop of the output voltage of photovoltaic optimizer 12, such that the maximum power point of photovoltaic power generation system 1 can be tracked.

In particular embodiments, the loop of the input voltage of photovoltaic optimizer 12 may operate under open-loop control when input voltage reference signal Vin_ref of photovoltaic optimizer 12 is less than input voltage Vin of photovoltaic optimizer 12. Thus, power switch Q1 can remain on, and the duty ratio of power conversion converter 121 is 1. Also, the loop of the input voltage of photovoltaic optimizer 12 may operate in a closed loop when input voltage reference signal Vin_ref of photovoltaic optimizer 12 is greater than input voltage Vin of photovoltaic optimizer 12, such that power switch Q1 and power switch Q2 are turned on alternately (e.g., the duty ratio of power conversion converter 121 is less than 1). Thus, MPPT 122a can detect the duty ratio of power switch Q1 in order to determine the operation mode of photovoltaic optimizer 12.

Photovoltaic optimizer 12 may operate in the first mode (e.g., the through mode) when duty ratio DUTY of power switch Q1 is 1. In the first mode, photovoltaic optimizer 12 can track the input voltage of inverter 13 (e.g., output voltage Vo of photovoltaic optimizer 12), and inverter 13 can adjust its input voltage to track the maximum power point of photovoltaic power generation system 1. At this time, power switch Q1 remains on and the input voltage of photovoltaic optimizer 12 can be approximately equal to the output voltage of photovoltaic optimizer 12. In one example, in the first mode, photovoltaic optimizer 12 can adjust input voltage reference signal Vin_ref according to the change of the input voltage of inverter 13, in order to track the maximum power point of photovoltaic power generation system 1.

Photovoltaic optimizer 12 can operate in the second mode (e.g., the switching mode) when duty ratio DUTY of power switch Q1 is less than 1. In the second mode, photovoltaic optimizer 12 can track the output voltage of photovoltaic panel 11 (e.g., input voltage Vin of photovoltaic optimizer 12) in order to track the maximum power point of photovoltaic power generation system 1. That is, photovoltaic optimizer 12 can adjust input voltage reference signal Vin_ref according to the change of the input voltage of photovoltaic optimizer 12, in order to track the maximum power point of photovoltaic power generation system 1.

Photovoltaic optimizer 12 can operate in the third mode (e.g., the limited voltage mode) when the output voltage of photovoltaic optimizer 12 is not less than the preset maximum voltage. In the third mode, photovoltaic optimizer 12 may operate in the limited voltage mode and limits its output voltage to the preset maximum voltage. In this case, inverter 13 can adjust the output power of photovoltaic optimizer 12 (e.g., by drawing current) in order to track the maximum power point of photovoltaic power generation system 1. In particular embodiments, the maximum power point of photovoltaic power generation system 1 can be tracked by tracking the input voltage of photovoltaic optimizer 12 and/or the input voltage of inverter 13. As such, photovoltaic optimizer 12 can cooperate with inverter 13 to realize effective recognition and tracking of the maximum power point of photovoltaic power generation system 1. Thus, the output power of photovoltaic power generation system 1 can be improved when some of photovoltaic panels are partially covered.

Photovoltaic optimizer 12 can adjust input voltage reference signal Vin_ref of photovoltaic optimizer 12 corresponding to input voltage Vin of photovoltaic optimizer 12, according to the changes of input voltage Vin, output voltage Vo, and/or output current Io of photovoltaic optimizer 12. In the first mode, photovoltaic optimizer 12 can increase or decrease input voltage reference signal Vin_ref, according to the relationship between the operation point of the inverter 13 and the maximum power point of photovoltaic panel 11. Alternatively, in response to the increase of the output power of photovoltaic optimizer 12, input voltage reference signal Vin_ref in the next cycle may be obtained according to the output voltage of photovoltaic optimizer 12 in the present cycle in the first mode. For example, input voltage reference signal Vin_ref of photovoltaic optimizer 12 in the next cycle can be adjusted to be the output voltage of photovoltaic optimizer 12 in the present cycle minus a preset step, in order to track the maximum power point of the photovoltaic power generation system. Further, in response to the output power of photovoltaic optimizer 12 not increasing in the first mode, photovoltaic optimizer 12 can remain operating in the first mode, or can switch to the second mode.

In particular embodiments, control circuit 122 can decrease input voltage reference signal Vin_ref, such as by subtracting the first step from input voltage reference signal Vin_ref of photovoltaic optimizer 12 in the present cycle as input voltage reference signal Vin_ref of photovoltaic optimizer 12 in the next cycle, when the output power of photovoltaic optimizer 12 does not increase and the input voltage of photovoltaic optimizer 12 increases in the second mode. Control circuit 122 can increase input voltage reference signal Vin_ref, such as by increasing input voltage reference signal Vin_ref of photovoltaic optimizer 12 in the present cycle by the second step to be input voltage reference signal Vin_ref of photovoltaic optimizer 12 in the next cycle when the output power of photovoltaic optimizer 12 does not increase and the input voltage of photovoltaic optimizer 12 decreases in the second mode.

Control circuit 122 can increase input voltage reference signal Vin_ref, such as by increasing input voltage reference signal Vin_ref of photovoltaic optimizer 12 in the present cycle by the second step to be input voltage reference signal Vin_ref of photovoltaic optimizer 12 in the next cycle when the output power of photovoltaic optimizer 12 increases and the input voltage of photovoltaic optimizer 12 increases in the second mode. Control circuit 122 can decrease input voltage reference signal Vin_ref, such as by decreasing input voltage reference signal Vin_ref of photovoltaic optimizer 12 in the present cycle by the first step to be input voltage reference signal Vin_ref of photovoltaic optimizer 12 in the next cycle when the output power of photovoltaic optimizer 12 increases and the input voltage of photovoltaic optimizer 12 decreases in the second mode. That is, control circuit 122 can gradually adjust input voltage reference signal Vin_ref of photovoltaic optimizer 12 according to input voltage Vin of photovoltaic optimizer 12, in order to adjust error signal Vin_err. Thus, control circuit 122 can control PWM generation circuit 122h to adjust duty ratio DUTY of power conversion converter 121, in accordance with error signal Vin_err. As such, the output voltage of photovoltaic optimizer 12 can be adjusted, thereby adjusting the output power photovoltaic optimizer 12, in order to track the maximum power point of photovoltaic power generation system 1.

In particular embodiments, control circuit 122 can obtain the input voltage reference signal of photovoltaic optimizer 12 in the next cycle, in accordance with the output voltage of photovoltaic optimizer 12 in the present cycle in the third mode, such as by subtracting a preset step from output voltage Vo of photovoltaic optimizer 12 in the present cycle as input voltage reference signal Vin_ref of photovoltaic optimizer 12 in the next cycle. For example, when inverter 13 has not started up, photovoltaic panel 11 may be in an open circuit state and the output voltage of photovoltaic panel 11 may be greater than preset maximum voltage Vh. That is, the input voltage of photovoltaic optimizer 12 may be greater than input voltage reference signal Vin_ref of photovoltaic optimizer 12. At that time, MPPT 122a in control circuit 122 can sample the output voltage of photovoltaic optimizer 12, which may be limited to preset maximum voltage Vh, and can adjust input voltage reference signal Vin_ref in the next cycle to the output voltage of photovoltaic optimizer 12 in the present cycle minus a preset step. After starting up, inverter 13 can draw current to increase the output power of photovoltaic optimizer 12 until the output voltage of photovoltaic panel 11 is less than preset maximum voltage Vh. In that time, photovoltaic optimizer 12 may switch to the first mode.

Figure 3:
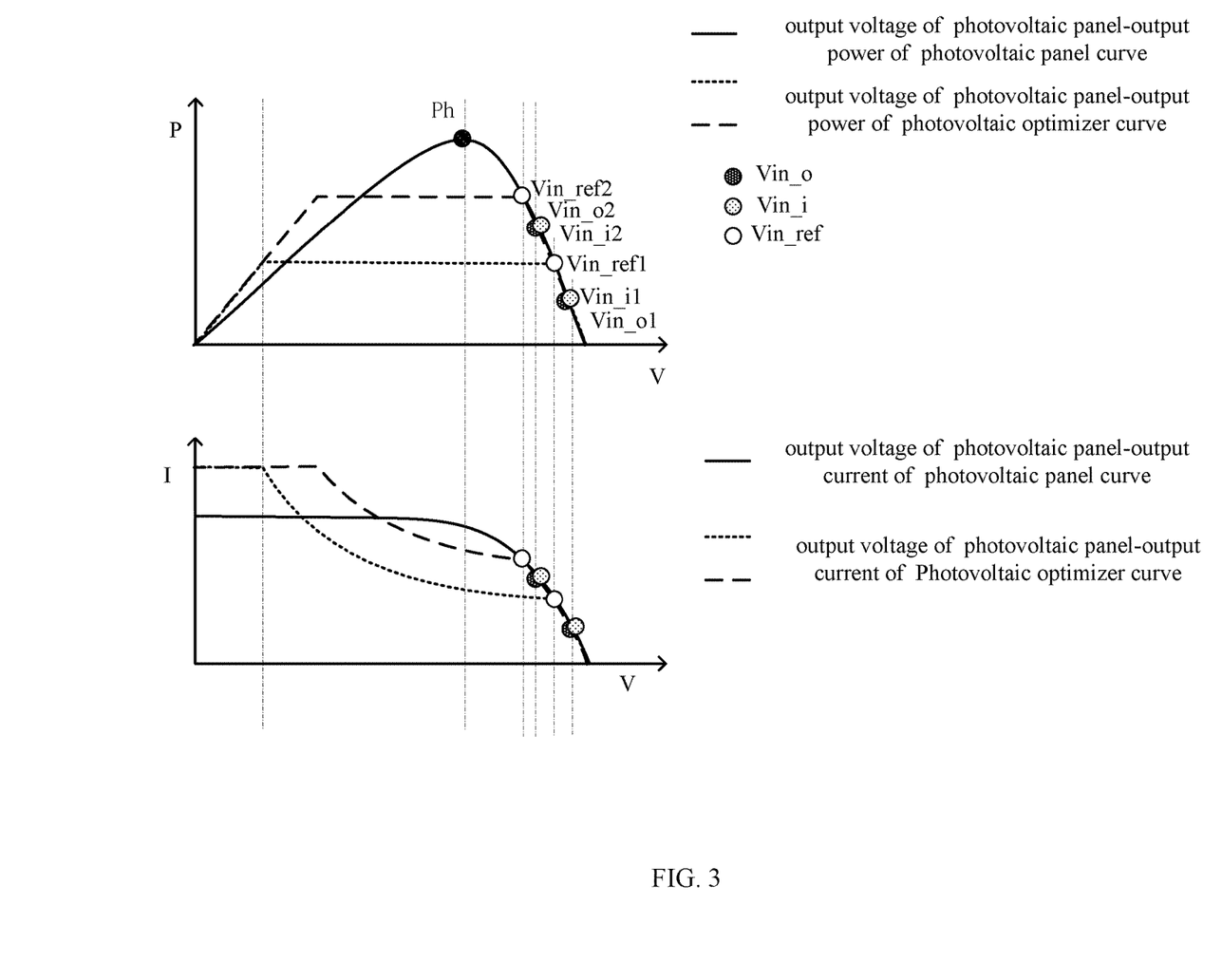
FIGS. 3 to 6 are waveform diagrams of example operation of the photovoltaic power generation system, in accordance with embodiments of the present invention.

Referring now to FIGS. 3-6, shown are waveform diagrams of example operation of the photovoltaic power generation system, in accordance with embodiments of the present invention. FIG. 3 shows an example operation whereby the photovoltaic optimizer operates in the through mode and the operation point of the inverter is at the right of the maximum power point. Here, output power P of photovoltaic panel 11 increases initially, and then decreases with the increase of output voltage V of photovoltaic panel 11. In addition, the output current of photovoltaic panel 11 can essentially remain the same before the operation point of photovoltaic panel 11 arrives at maximum power point Ph, and can decrease with the increase of output voltage V after the operation point of photovoltaic panel 11 arrives at maximum power point Ph. Switch Q1 of the power conversion converter can remain on when input voltage reference signal Vin_ref of photovoltaic optimizer 12 is less than input voltage Vin_o of photovoltaic optimizer 12. Thus, the operation mode of photovoltaic optimizer 12 can be determined by detecting the duty ratio of photovoltaic optimizer 12.

The duty ratio of photovoltaic optimizer 12 can be 1 when switch Q1 remains on; that is, photovoltaic optimizer 12 may operate in the through mode. At that time, the input voltage of photovoltaic optimizer 12 may be relatively close to the output voltage of photovoltaic optimizer 12. As shown in FIG. 3, input voltage Vin_o1 of photovoltaic optimizer 12 may be nearly the same as output voltage Vin_i1 of photovoltaic optimizer 12. In addition, the loop of the input voltage of photovoltaic optimizer 12 can be maintained under open-loop control and the inverter can track the maximum power point of photovoltaic power generation system. When the operation point of the inverter is at the right of the maximum power point Ph, the inverter can decrease its input voltage (e.g., the output voltage of photovoltaic optimizer 12), such as by decreasing the input voltage of the inverter from Vin_i1 to Vin_i2. If the output power of photovoltaic optimizer 12 increases, photovoltaic optimizer 12 can decrease input voltage reference signal Vin_ref. In one example, input voltage reference signal Vin_ref of photovoltaic optimizer 12 can be set to be the input voltage of the inverter (e.g., the output voltage of the photovoltaic optimizer 12) minus a third step, in order to guarantee the open-loop operation of the loop of the input voltage loop of photovoltaic optimizer 12. That is, input voltage reference signal Vin_ref may be less than the input voltage of photovoltaic optimizer 12. For example, when the input voltage of the inverter is Vin_i1, the input voltage reference signal in the next cycle can be set to be input voltage Vin_i1 minus the third step (e.g., Vin_ref1). When the input voltage of the inverter is Vin_i2, the input voltage reference signal in the next cycle may be set to be input voltage Vin_i2 minus the third step (e.g., Vin_ref2). The process may be repeated until the inverter tracks the maximum power point.

During the process to track maximum power point Ph through the inverter, the operation point of photovoltaic panel 11 may occur back and forth between the two sides of maximum power point Ph. In particular embodiments, when the output power of the photovoltaic optimizer does not increase (e.g., when the adjustment direction of the input voltage of the inverter makes the output power of photovoltaic optimizer 12 decrease), photovoltaic optimizer 12 may remain in the first mode, or can switch from the first mode to the second mode. If photovoltaic optimizer 12 switches from the first mode to the second mode, the input voltage reference signal can be adjusted according to the change of the input voltage of photovoltaic optimizer 12 (see, e.g., FIGS. 5 and 6). If photovoltaic optimizer 12 remains operating in the first mode, the loop of the input voltage of photovoltaic optimizer 12 may remain under open-loop control. Photovoltaic optimizer 12 can decrease the input voltage reference signal when the operation point of the photovoltaic optimizer is at the right of the maximum power point, and photovoltaic optimizer 12 can increase the input voltage reference signal when the operation point of the photovoltaic optimizer is at the left of the maximum power point.

Figure 4:
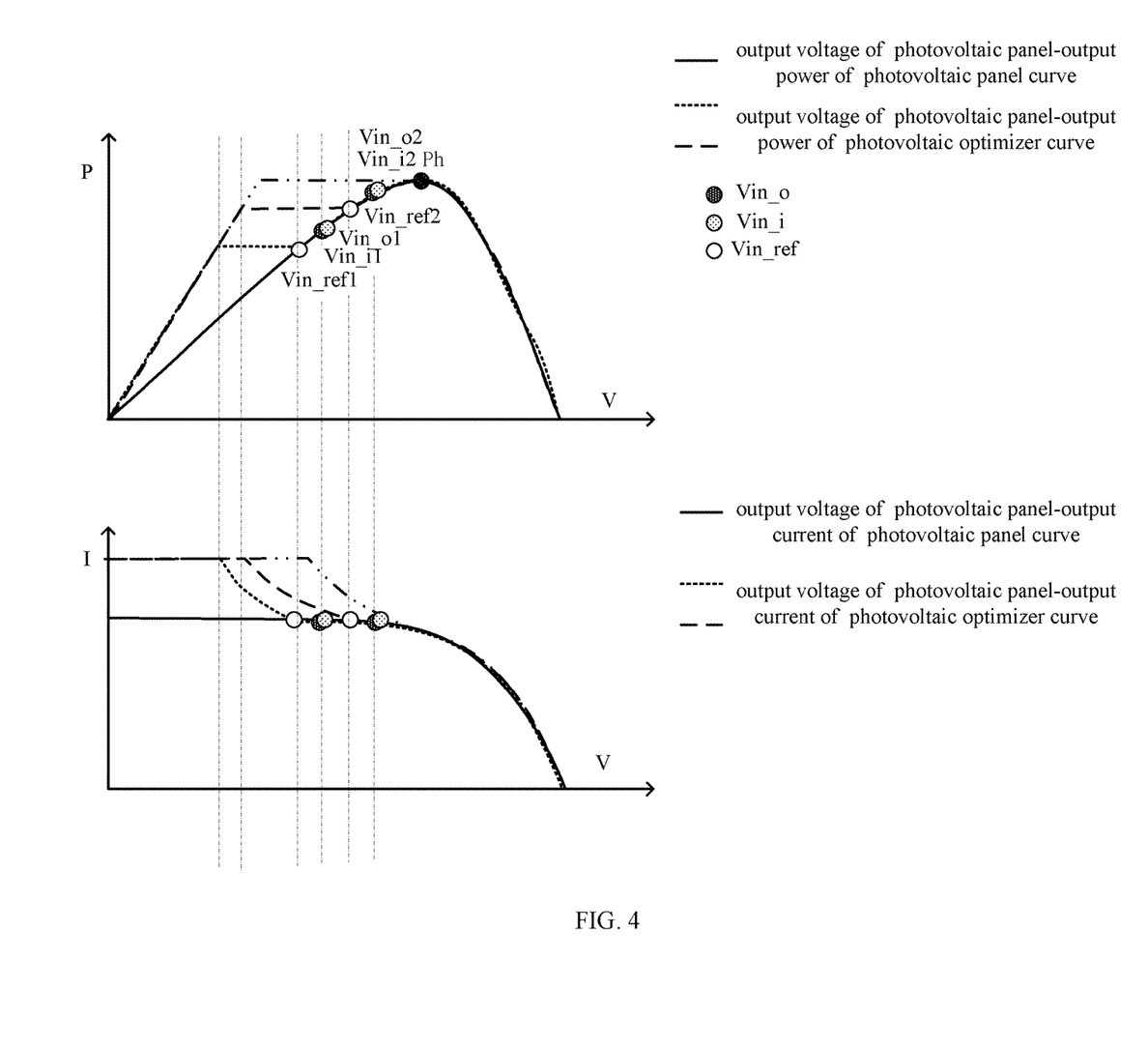

Referring now to FIG. 4, shown is a diagram of an example operation that the photovoltaic optimizer operates in the through mode and the operation point of the inverter is at the left of the maximum power point. The operation principle of FIG. 4 may be similar to that of FIG. 3. The duty ratio of photovoltaic optimizer 12 may be 1 and photovoltaic optimizer 12 can operate in the through mode. At that time, the input voltage of photovoltaic optimizer 12 may be relatively close to the output voltage of photovoltaic optimizer 12. As shown in FIG. 4, input voltage Vin_o1 of photovoltaic optimizer 12 may be nearly the same as output voltage Vin_i1 of photovoltaic optimizer 12. At this time, the loop of the input voltage of photovoltaic optimizer 12 can be maintained under open-loop control and the inverter can track the maximum power point of the photovoltaic panel. In such a case, when the input voltage of the inverter (e.g., the output voltage of photovoltaic optimizer 12) increases, such as the input voltage of the inverter increasing from Vin_i1 to Vin_i2, photovoltaic optimizer 12 can increase input voltage reference signal Vin_ref if the output power of photovoltaic optimizer 12 increases.

In particular embodiments, input voltage reference signal Vin_ref of photovoltaic optimizer 12 may be set to be the input voltage of the inverter (e.g., the output voltage of photovoltaic optimizer 12) minus the third step, in order to guarantee that the loop of the input voltage of photovoltaic optimizer 12 operates under the open-loop control. For example, when the input voltage of the inverter is Vin_i1, the input voltage reference signal in the next cycle is Vin_ref1, which is equal to input voltage Vin_i1 minus the third step. Also for example, when the input voltage of the inverter is Vin_i2, the input voltage reference signal in the next cycle is Vin_ref2, which is equal to input voltage Vin_i2 minus the third step. This process may be repeated until the inverter tracks the maximum power point.

Figure 5:
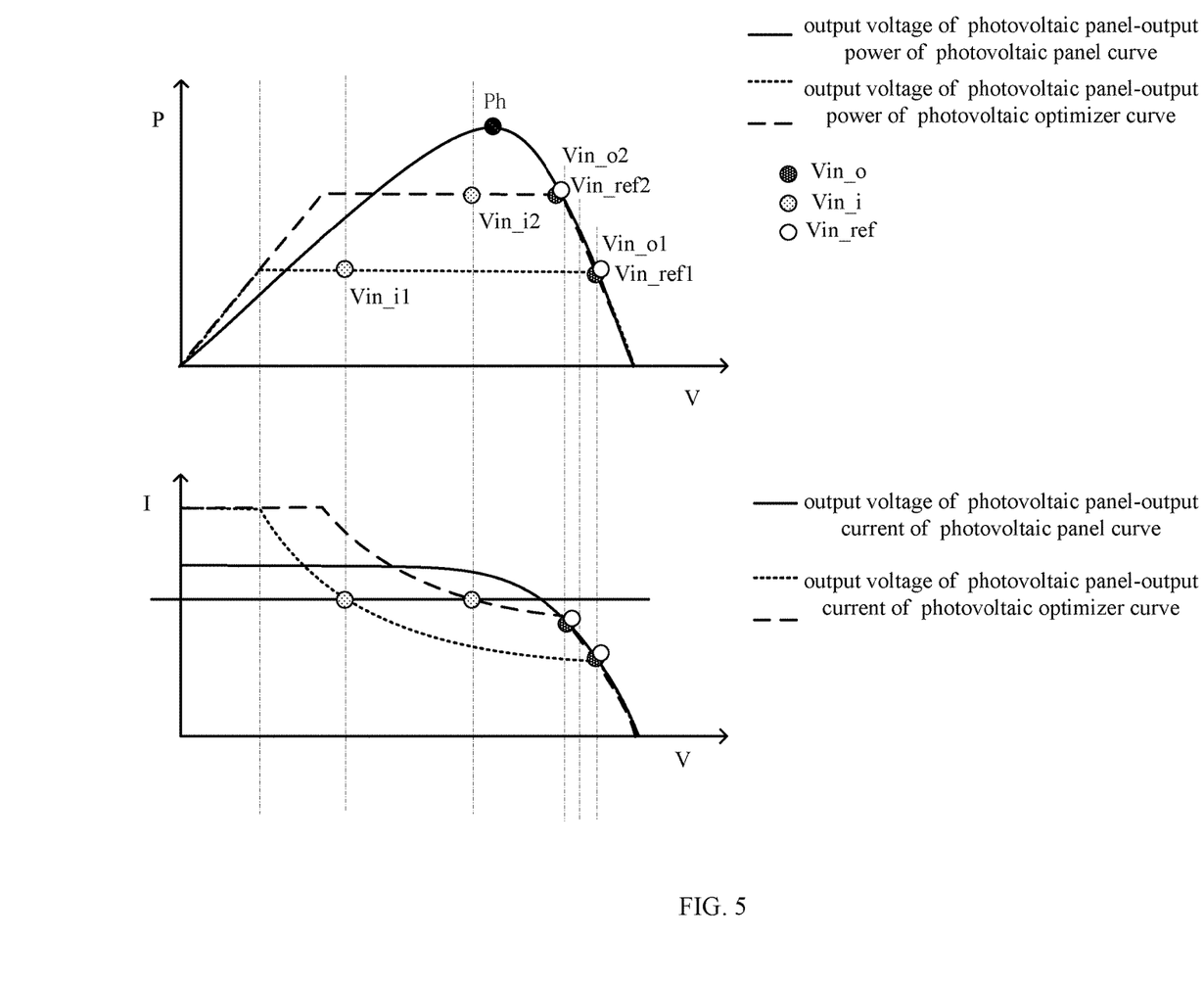

Referring now to FIG. 5, shown is a diagram of an example operation that the photovoltaic optimizer operates in the second mode (e.g., the switching mode) and the operation point of the photovoltaic optimizer is at the right of the maximum power point. In this example, the photovoltaic power generation system can include multiple photovoltaic panels. If one of the photovoltaic panels coupled to a corresponding photovoltaic optimizer is covered, the output power of the photovoltaic optimizer may decrease. Thus, the inverter can track the uncovered photovoltaic panels in order to maintain the fixed input current. That is, the photovoltaic optimizers corresponding to the photovoltaic panels which are covered may operate in the switching mode, and the photovoltaic optimizers corresponding to the photovoltaic panels which are not covered may operate in the through mode.

Input voltage reference signal Vin_ref of photovoltaic optimizer 12 may be greater than input voltage Vin_o when the photovoltaic panel is covered. In such a case, photovoltaic optimizer 12 may operate in the switching mode and the duty ratio of photovoltaic optimizer 12 can be less than 1. As shown in V-I curve of FIG. 5, when the input voltage of photovoltaic optimizer 12 considerably differs from the output voltage of photovoltaic optimizer 12, the photovoltaic optimizer 12 may operate in the switching mode to track the maximum power point of the system. Therefore, power switch Q1 in photovoltaic optimizer 12 may not operate in the through mode. In this example, since the input current of the inverter is constant, the output voltage of the photovoltaic optimizer moves horizontally in V-I curve. If the output power of photovoltaic optimizer 12 does not increase, and the input voltage of photovoltaic optimizer 12 increases, or the output power of photovoltaic optimizer 12 increases, and the input voltage of photovoltaic optimizer 12 decreases, the operation point of photovoltaic optimizer 12 is at the right side of the maximum power point. That is, photovoltaic optimizer 12 can gradually reduce input voltage reference signal Vin_ref, such as by decreasing input voltage reference signal Vin_ref in the present cycle by the first step to be input voltage reference signal Vin_ref in the next cycle.

Figure 6:
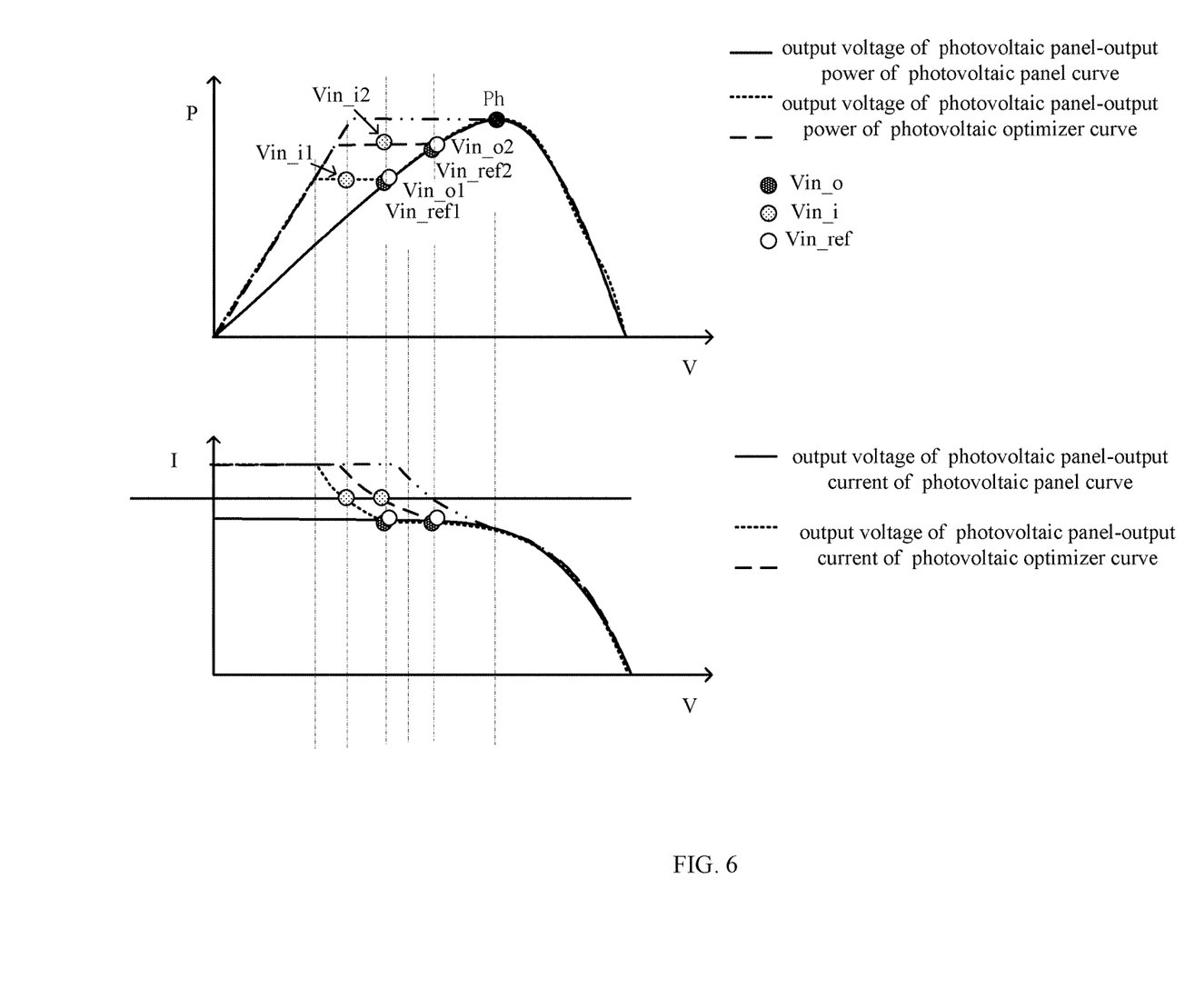

Referring now to FIG. 6, shown is a diagram of an example operation that photovoltaic optimizer 12 operates in the second mode and the operation point of the photovoltaic optimizer is at the left of the maximum power point. The operation principle of FIG. 6 may be similar to that of FIG. 5. Thus, input voltage reference signal Vin_ref of photovoltaic optimizer 12 may be greater than input voltage Vin_o of photovoltaic optimizer 12 when the photovoltaic panel is covered. In such a case, photovoltaic optimizer 12 can operate in the switching mode and the duty ratio of photovoltaic optimizer 12 is less than 1. As shown in V-I curve of FIG. 6, since the input current of the inverter is constant, the output voltage of photovoltaic optimizer 12 moves to the right horizontally. If the output power of photovoltaic optimizer 12 increases, and the input voltage of photovoltaic optimizer 12 can increase. Or, if the output power of photovoltaic optimizer 12 does not increase, and the input voltage of photovoltaic optimizer 12 decreases, the operation point of photovoltaic optimizer 12 may be at the left side of the maximum power point. That is, photovoltaic optimizer 12 can gradually increase input voltage reference signal Vin_ref, such as by increasing input voltage reference signal Vin_ref in a present cycle by the second step to be input voltage reference signal Vin_ref in a next cycle. Thus, photovoltaic optimizer 12 may increase or decrease input voltage reference signal Vin_ref in the present cycle in order to obtain a new input voltage reference signal, according to the relationship between the operation point of photovoltaic optimizer 12 and the maximum power point of the photovoltaic panels in the second mode. Therefore, the maximum power point of the system can be effectively tracked based on the new input voltage reference signal, in order to improve the efficiency of the system.

Figure 7:
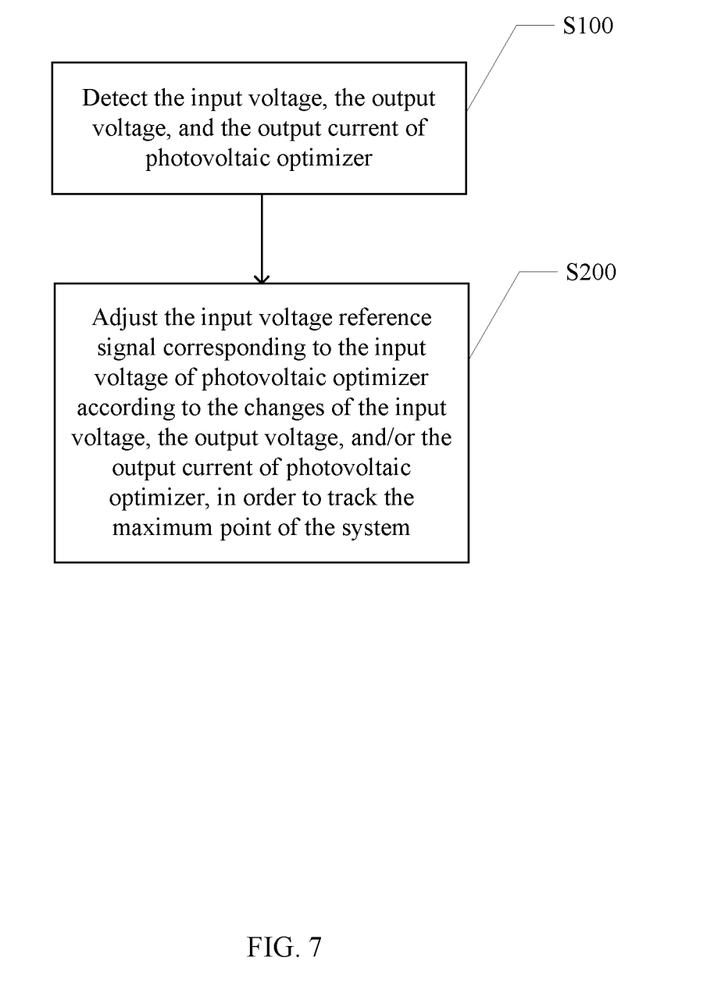
FIG. 7 is a flow diagram of an example power tracking method, in accordance with embodiments of the present invention.

Referring now to FIG. 7, shown is a flow diagram of an example power tracking method, in accordance with embodiments of the present invention. Here, the power tracking method may be applied to a photovoltaic power generation system that includes the inverter and multiple photovoltaic optimizers coupled in series between the input terminals of the inverter. This example power tracking method can include, at S100, the input voltage, the output voltage, and the output current of the photovoltaic optimizer being detected. At S200, the photovoltaic optimizer can adjust the input voltage reference signal, corresponding to the input voltage of the photovoltaic optimizer, according to the changes of the input voltage, the output voltage, and/or the output current of the photovoltaic optimizer, in order to track the maximum power point of the system. In such a case, the photovoltaic optimizer can operate in the first mode or the second mode. In the first mode, the input voltage reference signal may be adjusted in accordance with the change of the output voltage of the photovoltaic optimizer. In the second mode, the input voltage reference signal may be adjusted in accordance with the change of the input voltage of the photovoltaic optimizer in the second mode.

Further, the photovoltaic optimizer can increase or decrease the input voltage reference signal, according to the relationship between the operation point of the inverter and the maximum power point of the photovoltaic panel in the first mode. In some embodiments, in response to the increase of the output power of the photovoltaic optimizer in the first mode, the input voltage reference signal in a next cycle can be obtained according to the output voltage of the photovoltaic optimizer in a present cycle. For instance, the input voltage reference signal of the photovoltaic optimizer in the next cycle may be adjusted to be the output voltage of the photovoltaic optimizer in the current cycle minus a preset step, in order to track the maximum power point of the photovoltaic power generation system. Further, in response to the output power of the photovoltaic optimizer not increasing in the first mode, the photovoltaic optimizer can remain operating in the first mode or switch from the first mode to the second mode.

Further, the photovoltaic optimizer can increase or decrease the input voltage reference signal in the second mode, according to the relationship between the operation point of the photovoltaic optimizer and the maximum power point of the photovoltaic panel. Alternatively, if the output power of the photovoltaic optimizer does not increase, and the input voltage of the photovoltaic optimizer increases, or the output power of the photovoltaic optimizer increases, and the input voltage of the photovoltaic optimizer can decrease, and the operation point of the photovoltaic optimizer is at the right of the maximum power point of the photovoltaic panel. In such a case, the input voltage reference signal may be decreased, such as by decreasing the input voltage reference signal of the photovoltaic optimizer in a present cycle by the first step to be the input voltage reference signal of the photovoltaic optimizer in a next cycle.

If the output power of the photovoltaic optimizer increases, and the input voltage of the photovoltaic optimizer increases, or the output power of the photovoltaic optimizer does not increase, and the input voltage of the photovoltaic optimizer decreases, the operation point of the photovoltaic optimizer may be at the left of the maximum power point of the photovoltaic panel. In such a case, the input voltage reference signal be increased, such as by increasing the input voltage reference signal of the photovoltaic optimizer in a present cycle by the second step to be the input voltage reference signal of the photovoltaic optimizer in a next cycle. Thus, the maximum power point of the photovoltaic power generation system can be tracked. It should be understood that the first step can be equal to the second step in some cases, and not equal in other cases. Furthermore, the values of the first step and the second step can be fixed in some cases, and variable in other cases.

Further, the photovoltaic optimizer can operate in the third mode. In the third mode, the input voltage reference signal in a next cycle can be obtained in accordance with the output voltage of photovoltaic optimizer in a present cycle. For example, the input voltage reference signal of the photovoltaic optimizer in a next cycle can be adjusted to the output voltage of the photovoltaic optimizer in the present cycle minus a preset step, in order to track the maximum power point of the photovoltaic power generation system.

In particular embodiments, the maximum power point of the system can be tracked by tracking the input voltage, the output voltage, and the output current of the photovoltaic optimizer. Therefore, the photovoltaic optimizer can cooperate with the inverter to achieve effective recognition and tracking of the maximum power point of the photovoltaic power generation system, such that the output power of the photovoltaic power generation system is effectively improved when some panels are covered.

Figure 8:
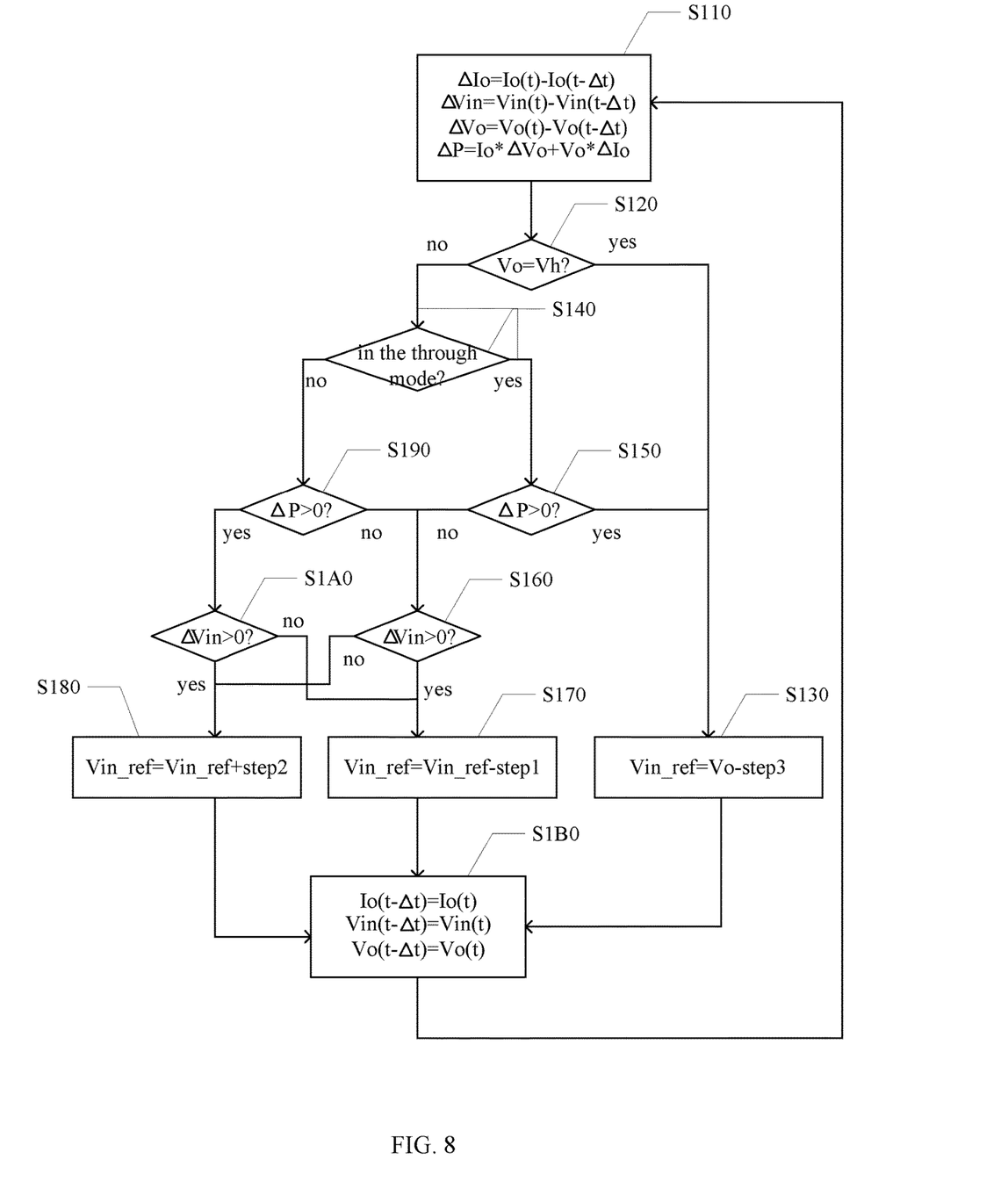
FIG. 8 is a flow diagram of an example power tracking method, in accordance with embodiments of the present invention.

Referring now to FIG. 8, shown is a flow diagram of an example power tracking method, in accordance with embodiments of the present invention. In this particular example, at S110, the input voltage, the output voltage, and the output current of the photovoltaic optimizer in a present cycle can be detected. At S120, whether output voltage Vo of the photovoltaic optimizer is greater than preset maximum voltage Vh may be determined. Then, S130 may be performed if output voltage Vo is greater than preset maximum voltage Vh, and S140 may be performed if output voltage Vo is not greater than preset maximum voltage Vh. At S130, input voltage reference signal Vin_ref in a next cycle can be adjusted to be output voltage Vo of the photovoltaic optimizer in the present cycle minus step3.

In S140, whether the photovoltaic optimizer operates in the through mode can be determined. For example, the operation mode of photovoltaic optimizer may be determined according to the duty ratio of the power conversion converter of the photovoltaic optimizer. In a buck converter example, the photovoltaic optimizer can operate in the through mode when the duty ratio of the power conversion converter of the photovoltaic optimizer is 1, and then S150 may be performed. The photovoltaic optimizer can operate in the switching mode when the duty ratio of the power conversion converter of the photovoltaic optimizer is less than 1, and then S190 may be performed.

At S150, whether the change of the output power of the photovoltaic optimizer is positive (e.g., whether the output power of the photovoltaic optimizer increases) can be determined. When the output power of the photovoltaic optimizer increase, S130 can be performed. When the output power of the photovoltaic optimizer does not increase, the photovoltaic optimizer may switch from the through mode to the switching mode. Then, S160 may be performed in order to track the maximum power point of the system. In another example, the photovoltaic optimizer can continue operating in the through mode when the output power of the photovoltaic optimizer does not increase. In such a case, the photovoltaic optimizer can decrease the input voltage reference signal when the operation point of the photovoltaic optimizer is at the right of the maximum power point, and may increase the input voltage reference signal when the operation point of the photovoltaic optimizer is at the left of the maximum power point.

At S160, whether the change of the input voltage of the photovoltaic optimizer is positive (e.g., whether the input voltage of the photovoltaic optimizer increases) may be determined). On one hand, the operation point of the photovoltaic optimizer is at the right of the maximum power point when the input voltage of the photovoltaic optimizer increases. Then, S170 may be performed in order to decrease the input voltage reference signal. On the other hand, the operation point of the photovoltaic optimizer is at the left of the maximum power point when the input voltage of the photovoltaic optimizer does not increase. After that, S180 may be performed in order to increase the input voltage reference signal.

At S170, the input voltage reference signal in a next cycle can be adjusted to be the input voltage reference signal in the current cycle minus step1. That is, when the photovoltaic optimizer operates in the switching mode and the output power does not increase and the input voltage increases (e.g., the operation point of the photovoltaic optimizer is at the right of the maximum power point), the input voltage reference signal in a next cycle may be adjusted to the input voltage reference signal in the current cycle minus step1.

At S180, the input voltage reference signal in a next cycle can be adjusted to be the input voltage reference signal in the present cycle plus step2. That is, when the photovoltaic optimizer operates in the switching mode and the output power does not increase and the input voltage does not increase (e.g., the operation point of the photovoltaic optimizer is at the left of the maximum power point), the input voltage reference signal in a next cycle can be adjusted to be the input voltage reference signal in the present cycle plus step2. At S190, whether the change of the output power of the photovoltaic optimizer is positive (e.g., whether the output power of the photovoltaic optimizer increases) may be determined. Then, S1A0 may be performed when the output power of the photovoltaic optimizer increases, and S160 may be performed when the output power of the photovoltaic optimizer does not increase.

At S1A0, whether the change of the input voltage of the photovoltaic optimizer is positive (e.g., whether the input voltage of the photovoltaic optimizer increases) may be determined. On the one hand, the operation point of the photovoltaic optimizer is at the left of the maximum power point when the input voltage of the photovoltaic optimizer increases. Then, S180 may be performed to increase the input voltage reference signal. On the other hand, the operation point of the photovoltaic optimizer is at the right of the maximum power point when the input voltage of the photovoltaic optimizer does not increase. After that, S170 may be performed in order to decrease the input voltage reference signal.

That is, step1 may be subtracted from the input voltage reference signal in the present cycle as the input voltage reference signal in a next cycle when the output power of photovoltaic optimizer 12 does not increase, and the input voltage of photovoltaic optimizer 12 increases (e.g., the operation point of the photovoltaic optimizer is at the right of the maximum power point) in the switch mode. The input voltage reference signal in the next cycle can be adjusted to be the input voltage reference signal in the present plus step2 when the output power of photovoltaic optimizer 12 does not increase, and the input voltage of photovoltaic optimizer 12 does not increase (e.g., the operation point of the photovoltaic optimizer is at the left of the maximum power point) in the switch mode. Step step1 may be subtracted from input voltage reference signal in the present cycle as the input voltage reference signal in the next cycle when the output power of photovoltaic optimizer 12 increases, and the input voltage of photovoltaic optimizer 12 does not increases (e.g., the operation point of the photovoltaic optimizer is at the right of the maximum power point) in the switch mode. The input voltage reference signal in the next cycle can be adjusted to be the input voltage reference signal in the present plus step2 when the output power of photovoltaic optimizer 12 increases, and the input voltage of photovoltaic optimizer 12 increases (e.g., the operation point of the photovoltaic optimizer is at the left of the maximum power point) in the switch mode. It should be understood that the first step, the second step, and the third step can be equal to each other in some cases, and may be unequal in other cases. Furthermore, the values of the first step, the second step, and the third step can be fixed in some cases, and variable in other cases.

In S1B0, the input voltage, the output voltage, and the output current of the photovoltaic optimizer can be updated and then S110 may be performed. By tracking the input voltage, the output voltage, and the output current of the photovoltaic optimizer, the maximum power point of the system can be tracked in particular embodiments. Thus, the photovoltaic optimizer can cooperate with the inverter in order to realize effective recognition and tracking of the maximum power point of the photovoltaic power generation system, such that output power of the photovoltaic power generation system can be improved when some of photovoltaic panels are covered.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus for photovoltaic power generation, the apparatus comprising:
    a) an inverter; and
    b) at least one photovoltaic optimizer, wherein input terminals of each photovoltaic optimizer are coupled to output terminals of a photovoltaic panel, and output terminals of each photovoltaic optimizer are coupled in series with each other between input terminals of the inverter;
    c) wherein the photovoltaic optimizer is configured to adjust an input voltage reference signal according to changes of an input voltage of the inverter, thereby tracking a maximum power point of the photovoltaic panel, when the photovoltaic optimizer operates in a first mode, wherein a duty cycle of the photovoltaic optimizer is 1 during the first mode; and
    d) wherein the photovoltaic optimizer is configured to adjust the input voltage reference signal according to changes of an output voltage of the photovoltaic panel, thereby tracking the maximum power point of the photovoltaic panel, when the photovoltaic optimizer operates in a second mode, wherein the duty cycle of the photovoltaic optimizer is adjusted and less than 1 during the second mode.

2. The apparatus of claim 1, wherein in the first mode, the inverter is configured to adjust the input voltage thereof, and the photovoltaic optimizer is configured to operate in a through mode to track the input voltage of the inverter.

3. The apparatus of claim 1, wherein in the second mode, the photovoltaic optimizer is configured to operate in a switching mode to track the output voltage of the photovoltaic panel.

4. The apparatus of claim 1, wherein when the output voltage of the photovoltaic optimizer reaches a preset maximum value, the photovoltaic optimizer operates in a third mode to limit an output voltage of the photovoltaic optimizer to the preset maximum voltage, and the maximum power point of the photovoltaic panel is tracked in accordance with output power of the photovoltaic optimizer adjusted by the inverter.

5. The apparatus of claim 1, wherein the photovoltaic optimizer is configured to adjust the input voltage reference signal in accordance with a change of an output voltage of the photovoltaic optimizer that is equal to the input voltage of the inverter in the first mode, and to adjust the input voltage reference signal according to a change of an input voltage of the photovoltaic optimizer that is equal to the output voltage of the photovoltaic panel in the second mode.

6. The apparatus of claim 5, wherein in response to an increase in output power of the photovoltaic optimizer in the first mode, the photovoltaic optimizer is configured to obtain the input voltage reference signal in the next cycle, according to the output voltage of the photovoltaic optimizer in the present cycle.

7. The apparatus of claim 6, wherein in response to an increase in the output power of the photovoltaic optimizer in the first mode, the photovoltaic optimizer is configured to adjust the input voltage reference signal of the photovoltaic optimizer in the next cycle to be the output voltage of the photovoltaic optimizer in the present cycle minus a preset step.

8. The apparatus of claim 6, wherein in response to the output power of the photovoltaic optimizer not increasing in the first mode, the photovoltaic optimizer is configured to keep operating in the first mode or switch from the first mode to the second mode.

9. The apparatus of claim 5, wherein the photovoltaic optimizer is configured to decrease the input voltage reference signal when the output power of the photovoltaic optimizer does not increase and the input voltage of the photovoltaic optimizer increases, or when the output power of the photovoltaic optimizer increases and the input voltage of the photovoltaic optimizer decreases in the second mode.

10. The apparatus of claim 5, wherein the photovoltaic optimizer is configured to increase the input voltage reference signal when the output power of the photovoltaic optimizer does not increase and the input voltage of the photovoltaic optimizer decreases, or when the output power of the photovoltaic optimizer increases and the input voltage of the photovoltaic optimizer increases in the second mode.

11. The apparatus of claim 5, wherein the photovoltaic optimizer is configured to obtain the input voltage reference signal in the next cycle according to the output voltage of the photovoltaic optimizer in a present cycle in a third mode.

12. The apparatus of claim 1, wherein the photovoltaic optimizer is configured to adjust the input voltage reference signal according to a relationship between an operation point of the inverter and the maximum power point of the photovoltaic panel in the first mode.

13. The apparatus of claim 1, wherein the photovoltaic optimizer is configured to adjust the input voltage reference signal according to a relationship between an operation point of the photovoltaic optimizer and the maximum power point of the photovoltaic panel in the second mode.

14. The apparatus of claim 13, wherein when the operation point of the photovoltaic optimizer is at the right of the maximum power point, the input voltage reference signal in the next cycle is decreased based on the input voltage reference signal in the present cycle.

15. The apparatus of claim 13, wherein when the operation point of the photovoltaic optimizer is at the left of the maximum power point, the input voltage reference signal in the next cycle is increased based on the input voltage reference signal in the present cycle.

16. The apparatus of claim 1, wherein the photovoltaic optimizer comprises:
   a) a power converter configured to convert output power of the photovoltaic panel; and
   b) a control circuit configured to adjust the input voltage reference signal, corresponding to an input voltage of the photovoltaic optimizer, according to the changes of the input voltage of the photovoltaic optimizer, an output voltage of the photovoltaic optimizer, and/or an output current of the photovoltaic optimizer.

17. A method of power tracking applied to a photovoltaic power generation system having an inverter and a plurality of photovoltaic optimizers coupled in series between input terminals of the inverter, for each of the plurality of photovoltaic optimizers, the method comprising:
   a) adjusting an input voltage reference signal corresponding to an input voltage of the photovoltaic optimizer, in accordance with changes of the input voltage, an output voltage, and/or an output current of the photovoltaic optimizer, in order to track a maximum power point of a photovoltaic panel coupled to the photovoltaic optimizer;
   b) adjusting the input voltage reference signal in accordance with the change of an input voltage of the inverter that is equal to the output voltage of the photovoltaic optimizer in a first mode, thereby tracking a maximum power point of the photovoltaic panel, wherein a duty cycle of the photovoltaic optimizer is 1 during the first mode; and
   c) adjusting the input voltage reference signal in accordance with the change of the input voltage of the photovoltaic optimizer in a second mode, thereby tracking the maximum power point of the photovoltaic panel, wherein the duty cycle of the photovoltaic optimizer is adjusted and less than 1 during the second mode.

18. The power tracking method of claim 17, further comprising adjusting the input voltage reference signal in the next cycle according to the output voltage of the photovoltaic optimizer in the present cycle, when in a third mode.

* * * * *